United States Patent
Todasco et al.

(10) Patent No.: US 12,323,434 B2
(45) Date of Patent: Jun. 3, 2025

(54) PAGE INTEGRITY ASSURANCE

(71) Applicant: PAYPAL, INC., San Jose, CA (US)

(72) Inventors: Michael Charles Todasco, San Jose, CA (US); Vladimir Bacvanski, San Jose, CA (US); Michael Jim Tien Chan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 324 days.

(21) Appl. No.: 17/814,961

(22) Filed: Jul. 26, 2022

(65) Prior Publication Data
US 2024/0039925 A1 Feb. 1, 2024

(51) Int. Cl.
G06F 16/901 (2019.01)
G06F 16/958 (2019.01)
H04L 9/40 (2022.01)

(52) U.S. Cl.
CPC ........ H04L 63/126 (2013.01); G06F 16/9027 (2019.01); G06F 16/986 (2019.01); H04L 63/08 (2013.01)

(58) Field of Classification Search
CPC ....... H04L 63/08; H04L 63/12; H04L 63/126; G06F 16/90; G06F 16/901; G06F 16/9027; G06F 16/95; G06F 16/958; G06F 16/986
See application file for complete search history.

(56) References Cited

U.S. PATENT DOCUMENTS

| | | | |
|---|---|---|---|
| 4,309,569 A | 1/1982 | Merkle | |
| 7,565,543 B1 * | 7/2009 | Mungale | G06F 16/95 340/5.86 |
| 11,314,841 B1 * | 4/2022 | Montgomery | H04L 67/55 |
| 2008/0028444 A1 * | 1/2008 | Loesch | G06F 16/9574 726/4 |
| 2011/0258532 A1 * | 10/2011 | Ceze | G06F 16/9574 715/234 |
| 2016/0127410 A1 | 5/2016 | Borohovski et al. | |
| 2018/0191764 A1 * | 7/2018 | Chawla | G06F 16/951 |
| 2021/0194919 A1 * | 6/2021 | Lindemann | H04L 9/3247 |
| 2022/0060459 A1 * | 2/2022 | Odulinski | H04L 63/08 |

OTHER PUBLICATIONS

Chen et al., "An Image Authentication Scheme Using Merkle Tree Mechanisms" Future Internet, vol. No. 11, Issue No. 7, p. 149, Jul. 6, 2019.

* cited by examiner

Primary Examiner — D'Arcy Winston Straub
(74) Attorney, Agent, or Firm — Haynes and Boone, LLP

(57) ABSTRACT

Methods and systems are presented for authenticating web content. A request to authenticate web content is received from a user device. A first document object model (DOM) tree representing elements of the web content within a hierarchical structure is accessed. A hash value for each node of the first DOM tree is calculated based on the corresponding element of the web content represented by that node. A second DOM tree associated with a host of the web content is retrieved from a database. The second DOM tree represents predefined elements of the web content. The hash value calculated for each node of the first DOM tree is compared with a hash value associated with a corresponding node of the second DOM tree to determine whether the first DOM tree matches the second DOM tree. The web content is authenticated when the first DOM tree matches the second DOM tree.

20 Claims, 9 Drawing Sheets

```
<div class="form-row label-inline ">
  <div class="field-wrapper">
    <input id="is-PAYPAL" type="radio" class="input-radio "
      name="dwfrm_billing_paymentMethods_selectedPaymentMethodID"
      value="PAYPAL">
    <label for="is-PAYPAL">
    PayPal
    </label>
  </div>
</div>
```
⎫
⎬ 506
⎭

```
<div class="form-row label-inline">
  <div class="field-wrapper">
    <input id="is-DW_APPLE_PAY" type="radio" class="input-radio "
      name="dwfrm_billing_paymentMethods_selectedPaymentMethodID"
      value="DW_APPLE_PAY">
    <label for="is-DW_APPLE_PAY">
    Apple Pay
    </label>
  </div>
</div>
```
⎫
⎬ 508
⎭

FIG. 5

PAGE INTEGRITY ASSURANCE

TECHNICAL FIELD

The present specification generally relates to automated verification of web content, and more specifically, to verification of content within a web page based on analyzing elements of the web page according to various embodiments of the disclosure.

BACKGROUND

The emergence and development of computer networks and protocols, including the World Wide Web, allows users to take advantage of a wide variety of web applications and services provided by different websites. A website may include web pages with different types of content, such as text, multimedia, and software components, which are either displayed or executed in a web browser at a user's computing device. Such web content may also include references in the form of embedded hyperlinks to other websites, which may offer auxiliary content or services to the end user. For example, a merchant website may include a merchandise checkout web page with links to one or more digital payment service providers that facilitate electronic payment transactions for purchases arising from the merchant website. In addition to static content, a web page often includes content that is dynamically generated when the user visits or browses to the web page. Such dynamic web content, however, may be vulnerable to cyberattacks and phishing scams by hackers attempting to obtain unauthorized access sensitive user data, such as login credentials for accessing restricted areas of a website. For example, an attacker or cybercriminal may intercept and modify dynamic content (e.g., hyperlinks or other underlying software code) so that object references from a legitimate website appear authentic when displayed to a user but in fact redirect the user to a counterfeit web page or other web document that is controlled by the attacker. The counterfeit web page may also be designed to look genuine but is in fact intended to steal sensitive information from unsuspecting users. As such attacks become increasingly sophisticated, users need assurance from web service providers and website owners or hosts that the web content they receive on their devices is authentic and that any information they provide via a website remains secure.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings:

FIG. 5 illustrates programming code associated with a web page, according to an embodiment of the present disclosure;

DETAILED DESCRIPTION

Figure 1:
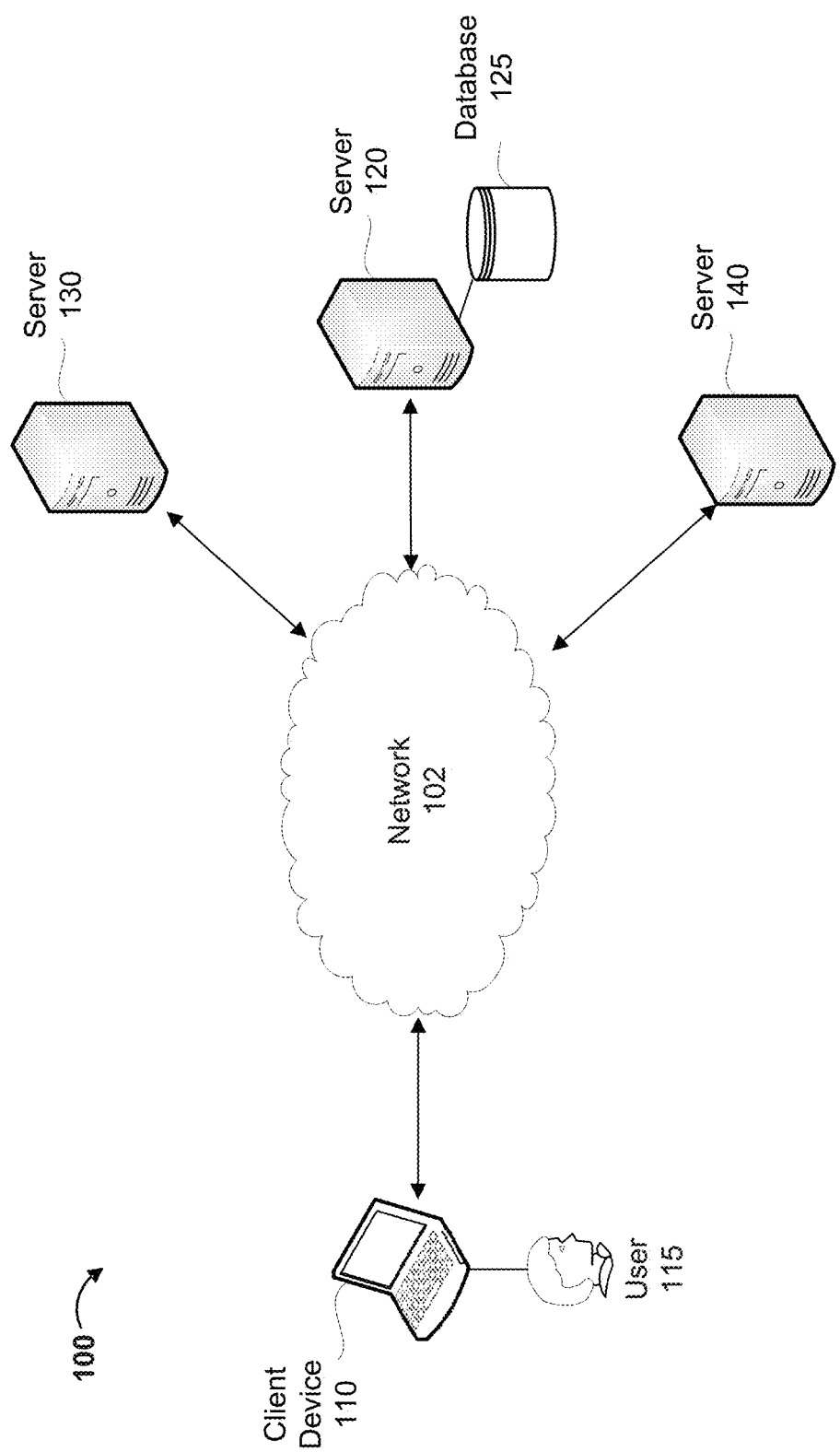
FIG. 1 is a block diagram of a network communication system according to an embodiment of the present disclosure.

Embodiments of the present disclosure relate to authenticating web content loaded on a user device for purposes of content integrity assurance and fraud protection. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

Further, when a particular feature, structure, or characteristic is described in connection with one or more embodiments, it is submitted that it is within the knowledge of one skilled in the relevant art to implement such feature, structure, or characteristic in connection with other embodiments whether or not explicitly described. It would also be apparent to one of skill in the relevant art that the embodiments, as described herein, can be implemented in many different embodiments of software, hardware, firmware, and/or the entities illustrated in the drawings. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, embodiments of the present disclosure may be used to provide an authentication tool for automatically validating the authenticity or integrity of web content loaded within an application executable at a user device. Such a content authentication tool may be implemented as, for example, a web application or web service provided by a web server over a network. The terms "web service" and "web application" are used interchangeably herein to refer broadly and inclusively to any type of website, application, service, protocol, or framework accessible via a web browser, or other client application executed by a computing device, over a local area network, medium area network, or wide area network, such as the Internet. In some implementations, the content authentication techniques disclosed herein may operate alongside an existing web service/application to extend the functionality of the web service/application to include web content authentication services. Examples of such existing web services/applications include, but are not limited to, electronic messaging services, social networking applications, and payment processing services.

In some embodiments, the web content authentication service (or content authenticator) may receive a request from a user device to authenticate web content loaded within an application executable at the user device. As the content for such web services may be vulnerable to interception and modification by an attacker or cybercriminal, e.g., as part of a "man in the middle" attack, the content authentication service may be used to authenticate or validate the authenticity of the web content. The application at the user's device may be, for example, a web browser, and the web content may be part of a web page loaded within the browser. However, it should be appreciated that embodiments are not intended to be limited thereto and that the disclosed content authentication techniques may be applied to different types of web content loaded within any of various applications executable at a user's device, e.g., web content included within an electronic message loaded within an electronic mail (e-mail) application at the user's device.

In some embodiments, the request from the user device may include a representation of the web content. The representation may be in the form of a data structure representing a plurality of elements of the web content. In some implementations, the data structure may be a document object model (DOM) tree. The DOM tree may represent a plurality of elements of the web content. The DOM tree may include a plurality of nodes corresponding to the elements of the web content. Each node of the DOM tree may represent a corresponding element of the web content within hierarchical structure of the DOM tree. Such a hierarchical tree structure may be independent of a particular computing platform or programming language. Alternatively, the request may include only data and programming code for the elements of the web content, and the DOM tree may be generated by the content authentication service at the server, based on the data and code included in the request. While various embodiments will be described below in the context of DOM trees, it should be appreciated that embodiments are not intended to be limited thereto and that the web content may be represented using other data structures or formats. Examples of such other data structures include, but are not limited to, a treemap, a search tree, a hash table, a stack, a graph, a graph-based model, or any other appropriate data structure that may be used for indexing and storing data representing elements of the web content, e.g., according to a content and a position of each element as would be displayed at the user device. Examples of such elements include, but are not limited to, text, images, hyperlinks, and user interface elements, such as input fields.

In some embodiments, a hash value may be calculated for each node of the DOM tree based on, for example, the content or position (or a combination of the content and position) of the corresponding element represented by that node of the DOM tree. The hash value associated with each node of the DOM tree may be compared with a predefined hash value associated with a corresponding node of predefined DOM tree associated with the web content. The nodes of this predefined second DOM tree may include predefined hash values for the corresponding elements of the web content. Each of the predefined hash values may be calculated based on a predetermined content and/or a predetermined position of the corresponding element. Based on the comparison of hash values, a determination may be made as to whether the first DOM tree (received from the client application) matches the second (predefined) DOM tree. The web content may be authenticated when the first DOM tree matches the second DOM tree. Alternatively, the first DOM tree may be converted into a hash tree and the comparison may involve comparing the respective hash values of the generated hash tree with that of a predefined hash tree associated with the web content. For example, a first hash value of each node of the generated hash tree may be compared with a second hash value of a corresponding node of the predefined hash tree. The web content in this example may be authenticated when it is determined that the generated hash tree (or first hash value of each node thereof) matches the predefined hash tree (or second hash value of the corresponding node thereof).

FIG. 1 is a block diagram of a network communication system 100 according to an embodiment of the present disclosure. System 100 includes a client device 110, a server 120, a server 130, and a server 140, all of which are communicatively coupled to one another via a network 102. In some embodiments, device 110 may communicate with each of servers 120, 130, and 140 via network 102 for purposes of accessing features of a web service or application executed by each of these servers. Device 110 may be any type of computing device with at least one processor, local memory, display, and one or more input devices (e.g., a mouse, QWERTY keyboard, touchscreen, microphone, or a T9 keyboard). Examples of such computing devices include, but are not limited to, a mobile phone, a personal digital assistant (PDA), a computer, a cluster of computers, a set-top box, or similar type of device capable of processing instructions. Each of servers 120, 130, and 140 may be any type of computing device, e.g., a web server or application server, capable of serving data to device 110 over network 102.

Network 102 may be any network or combination of networks that can carry data communication. Such network can include, but is not limited to, a wired (e.g., Ethernet) or a wireless (e.g., Wi-Fi and 3G) network. In addition, network 102 may include, but is not limited to, a local area network, medium area network, and/or wide area network, such as the Internet. Network 102 may support any of various networking protocols and technologies including, but not limited to, Internet or World Wide Web protocols and/or services. Intermediate network routers, gateways, or servers may be provided between components of communication system 100 depending upon a particular application or environment.

In some embodiments, device 110 executes a client application, e.g., a web browser, for accessing web content, e.g., one or more web pages associated with a website, served by each of servers 120, 130, and 140. The web content may be retrieved across network 102 using one or more communication protocols, for example, HyperText Transfer Protocol (HTTP). The content may be displayed in a content area of the client application. A user 115 may interact with the displayed content to perform various tasks associated with a web service executed by each server. For example, the displayed content served by server 120 may include a login form with fields for user 115 to enter login credentials, e.g., username and password, for logging into an account with a service provider associated with server 120. Server 120 may check the login credentials, as received from the user 115 and device 110 via network 102, against user account information stored in a database 125 to authenticate the user before providing access to features of one or more web services executed by server 120. Database 125 may be any type of data store or recordable storage medium configured to maintain, store, retrieve, and update information for server 120.

In some embodiments, the web services executed by server 120 may include a web content authentication service. As will be described in further detail below, such an authentication service may be used to authenticate the integrity of the web content loaded within the client application executable at device 110. As described above, such content may be vulnerable to man in the middle attacks in which an attacker or perpetrator intercepts communications exchanged between device 110 and one or more of servers 120, 130, and 140 over network 102. The perpetrator may be, for example, a user of another computing device (not shown) on network 102 who eavesdrops or attempts to impersonate user 115. The intent of the perpetrator in this example may be to steal personal information, such as login credentials or other sensitive account information, associated with user 115. In some cases, the perpetrator may modify dynamic elements (e.g., hyperlinks or programming code) of the web content, e.g., by injecting malicious code into the content or replacing legitimate object references with links to a counterfeit web page or other web document controlled by the perpetrator. As the counterfeit web content may look genuine, user 115 may rely on the web content authentication service to ensure the content received from server 120, 130, or 140 remains authentic when it is loaded at client device 110. As will be described below with respect to FIG. 2, the authentication service may enable dynamic web content received from one or more service providers to be authenticated in real time or near real time to provide an additional layer of security for users of the service provider(s).

Figure 2:
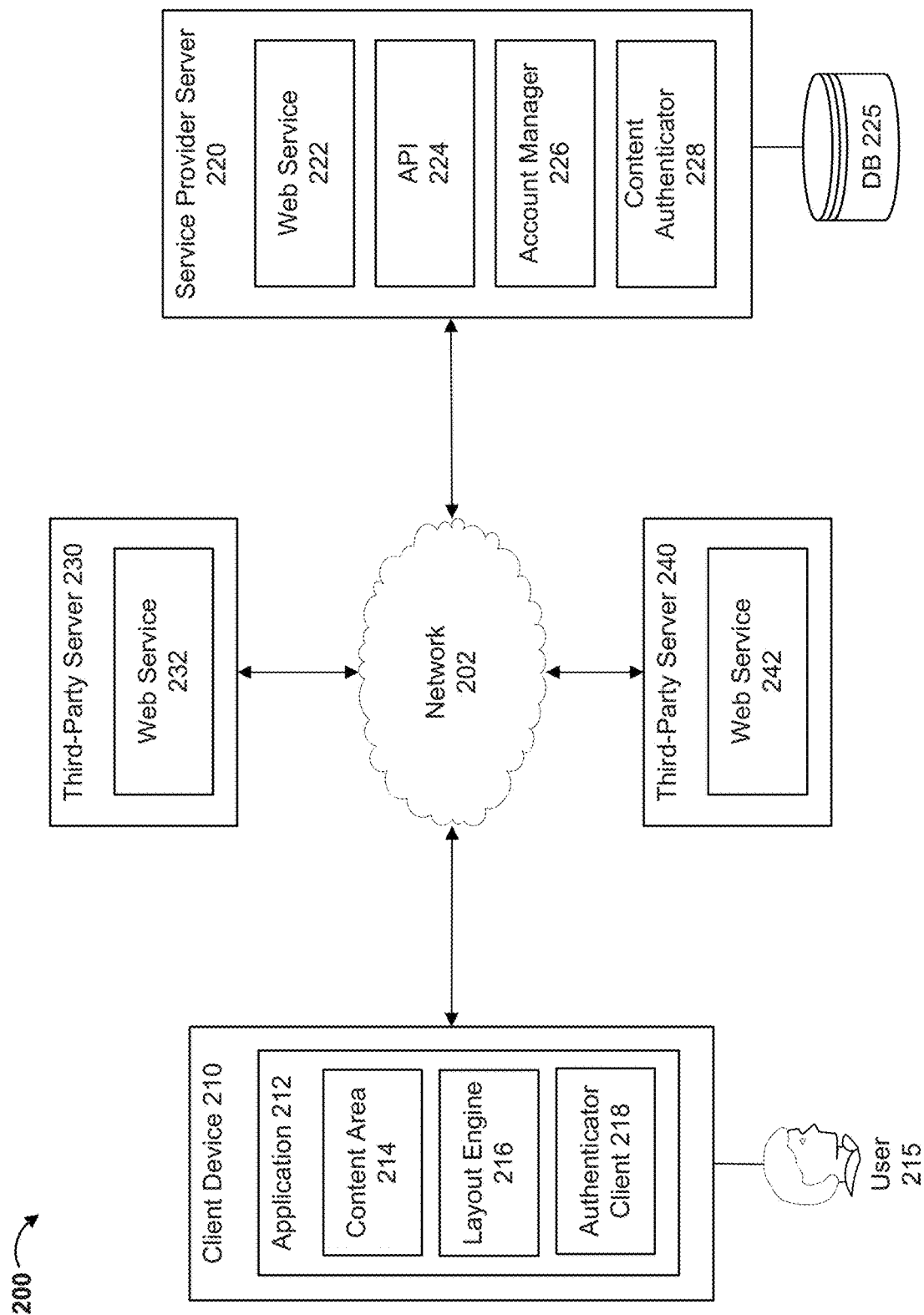
FIG. 2 is a block diagram of a web content authentication system according to an embodiment of the present disclosure.

FIG. 2 is a block diagram of a web content authentication system 200 according to an embodiment of the present disclosure. For discussion purposes, system 200 will be described using system 100 of FIG. 1, as described above, but system 200 is not intended to be limited thereto. As shown in FIG. 2, system 200 includes a client device 210, a service provider server 220, a third-party server 230, and a third-party server 240. Client device 210 may be implemented using, for example, client device 110 of FIG. 1, as described above. Likewise, servers 220, 230, and 240 may be implemented using, for example, servers 120, 130, and 140 of FIG. 1, respectively, as described above. Like the devices of system 100 of FIG. 1, client device 210 along with servers 220, 230 and 240 may be communicatively coupled to one another via a network 202. Network 202 may be implemented using, for example, network 102 of FIG. 1, as described above.

Client device 210 executes an application 212 that a user 215 of device 210 may use to access web content via network 202. In some embodiments, application 212 may be a web browser or similar application executable at device 210. The web content may include, for example, a plurality of elements associated with one or more web pages of a website hosted by service provider server 220 or one of third-party servers 230 and 240. The location of such pages may be identified by a Uniform Resource Identifier (URI) or Uniform Resource Locator (URL), e.g., a web address or Internet Protocol (IP) address. Application 112 may retrieve, for example, the web content associated with a URL from server 220, 230, or 240 via network 202. The web content may be displayed within a content area 214 of application 212. Content area 214 may be part of a graphical user interface (GUI) of application 212. User 215 may use a user input device (e.g., mouse or keyboard) to interact with the GUI of application 212, including content area 214, to initiate or perform various tasks, for example, directing application 212 to different web pages. User 215 may also enter information and data into content area 214 (or web page displayed therein) for transmission over network 202.

In some embodiments, application 212 may include a layout engine 216 for generating an interactive visual representation of the web content to be displayed within content area 214. The visual representation generated by layout engine 216 may be based on, for example, programming code specified by a particular server for the web content. The programming code may be written in, for example, a markup language, such as HyperText Markup Language (HTML) or Extensible Markup Language (XML), a system sheet language, such as Cascading Style Sheets (CSS), or a programming language, such as JavaScript, or any combination of the foregoing. In some embodiments, such programming code may be interpreted by layout engine 216 to generate and render static and dynamic elements of the web content within content area 214.

In some embodiments, the web content displayed or rendered within content area 214 may be associated with a web service executed by each of servers 220, 230, and 240. As shown in FIG. 2, service provider server 220 may execute a web service 222 while third-party servers 230 and 240 may execute web services 232 and 242, respectively. Each of web services 222, 232, and 242 may be any type of web service or web application, as described above. User 215 may access the functionality provided by each web service using application 212 over network 202. Application 212 may communicate with one or more of web services 222, 232, and 242 over network 202. As described above, application 212 may also receive input from user 215 via one or more input devices (not shown), for example, a mouse or keyboard, coupled to client device 210. The user input may include, but is not limited to, any type of input data, commands for application 212 or one or more of the web services to execute, or any other type of input to direct the operation of application 212 and/or the desired web service(s). Application 212 may use one or more communication protocols including, but not limited to, HTTP, to send and receive information to and from web services 222, 232, and 242 via network 202.

The service provider associated with server 220 may be, for example, a payment service provider (e.g., PayPal®) and web service 222 may include various payment processing services provided by the service provider to facilitate electronic or online transactions initiated by user 215 via application 212. User 215 in this example may initiate such transactions via web pages displayed within content area 214 of application 212. Such web pages may correspond to websites hosted by third-party servers 230 and 240 for implementing web services 232 and 242, respectively. Third-party servers 230 and 240 in this example may be associated with different business entities, e.g., online merchants, who provide the respective web services 232 and 242, e.g., in the form of online marketplace applications, via corresponding websites. Examples of third-party service websites include, but are not limited to, merchant sites, resource information sites, utility sites, real estate management sites, social networking sites, etc., which offer various items for purchase. The entities (e.g., online merchants) associated with third-party servers 230 and 240 may also be associated with the service provider, e.g., as trusted affiliates or business partners of the service provider.

In some implementations, web service 222 (e.g., payment processing service) may coordinate with web services 232 and 242 via network 202 to provide payment processing services for the online transactions initiated by user 215 through the corresponding marketplace websites hosted by third-party servers 230 and 240, respectively. For example, user 215 may be redirected from the marketplace or merchant website hosted by third-party server 230 or 240 to a login page hosted by service provider server 220 as part of web service 222. The login page may be displayed within content area 214 of application 212 for enabling user 215 to log into an account of user 215 with the service provider. Once logged in, user 215 may utilize the payment processing features of web service 222, e.g., via the GUI of application 212 to complete an online payment transaction for purchasing an item from a particular marketplace/merchant website. For example, web service 222 may enable purchase expenses to be directly and/or automatically debited from the corresponding user account via application 212.

In some embodiments, web service 222 may include a payment processing application (not shown) for processing purchases and/or payments for electronic transactions between user 215 and the entity (e.g., merchant) associated with third-party server 230 or 240. The payment processing application may assist with resolving electronic transactions through validation, delivery, and settlement. As such, the payment processing application settles account balances between user 215 and the merchant in this example, wherein accounts may be directly and/or automatically debited and/or credited using monetary funds in a manner accepted by the banking industry.

In some embodiments, an account manager 226 of service provider server 220 may be used to maintain the accounts for users and other entities (e.g., merchants) in a database (e.g., an account database) 225 coupled to server 220. Database (DB) 225 may be any type of data store for storing information accessible to service provider server 220. DB 225 may be implemented using, for example, database 125 of FIG. 1, as described above. In some implementations, each account may be associated with a profile and may include account information associated with one or more individual users (e.g., user 215 associated with device 210) and other entities (e.g., online merchants associated with third-party servers 230 and 240). For example, the account information stored in DB 225 may include, but is not limited to, account numbers, login credentials, credit card information, banking information, digital wallets, transaction history, Internet Protocol (IP) addresses, device information, and other private financial information. The stored account information may be used by account manager 226 to match profiles with individual users/entities. In some embodiments, account information also includes user purchase profile information, for example, account funding options and payment options associated with the user, payment information, receipts, and other information collected in response to completed funding and/or payment transactions.

In some implementations, each user may have identity attributes that are stored in association with the account information in DB 225. The identity attributes for each user may include login credentials (e.g., username and password information) to authenticate or verify the user's identity with the service provider server 220. Such user attributes may also include personal information, banking information and/or funding sources. For example, the attributes associated with user 215 may be passed to service provider server 220 (and account manager 226 thereof) as part of a login, search, selection, purchase, and/or payment request. The user attributes in this example may be utilized by account manager 226 to associate user 215 with one or more user accounts maintained by the service provider and later verify the authenticity of any requests received from a device (e.g., client device 210) associated with user 215.

In some embodiments, service provider server 220 may also include an application programming interface (API) 224 that is configured to serve content (e.g., web content) to users (including user 215) via network 202. For example, API 224 may be used to serve web content in response to HTTP requests received via network 202 from application 212 of client device 210. API 224 may also enable user 215 to interact with web service 222 via content area 214 or other user interface controls associated with the GUI of application 212. It should be appreciated that API 224 may use any of various communication protocols (e.g., RESTAPI, SOAP, etc.) to facilitate such interactions over network 202.

In some implementations, web service 222 may include predefined web content ready to be served to users via API 224. The predefined web content may include, for example, a login page that is served to users for logging into respective accounts of the users with the service provider to access various payment processing features of web service 222, as described above. The login page may be served in response to a login request received by service provider server 220 from client device 210 via network 202. Alternatively, the login request may be received by server 220 from one of the web services 232 and 242 of third-party servers 230 and 240, respectively, in response to an online transaction initiated by user 215 via application 212, as described above. In some implementations, the login request may include a unique identifier that may be used by the service provider server 220 to identify user 215 and an associated user account (or user profile) maintained by the service provider server 220. The unique identifier may be, for example, a unique hardware identifier (e.g., a media control access (MAC) address) or another appropriate device identifier, which may also be used to identify client device 210. Such an identifier may be stored in, for example, an operating system registry entry or a web cookie associated with application 212 at client device 210. In some cases, the web content served by service provider server 220 over network 202 may be vulnerable to man in the middle attacks, as described above. Accordingly, service provider server 220 may provide a content authentication service (or content authenticator) 228. As will be described in further detail, content authenticator 228 may be used to authenticate or verify the authenticity of the web content loaded within application 212 at client device 210.

While not shown in FIG. 2, it should be appreciated that client device 210 may include any of various additional applications as necessary or desired for a particular implementation. Examples of such additional applications include, but are not limited to, security applications for implementing client-side security features, programmatic client applications for interfacing with appropriate application programming interfaces (APIs), e.g., API 224, over network 202, and/or various other types of generally known programs and/or software applications. The features of one or more of these additional applications may be combined with those of application 212 for implementing the web content authentication techniques disclosed herein. Likewise, while only web services 222, 232, and 242 are shown in FIG. 2 for servers 220, 230, and 240, respectively, it should be appreciated that each server may include additional components or provide additional web services or applications as desired or needed for a particular implementation. For example, in addition to payment processing, service provider server 220 may be used to provide other services for account holders, including services related to automated web content authentication, as will be described in further detail below.

In some embodiments, service provider server 220 may use content authenticator 228 to provide a web content authentication service in addition to web service 222. Content authenticator 228 may receive a request from client device 210 via network 202 to authenticate web content loaded within application 212. As described above, application 212 in some embodiments may be a web browser executable at client device 210 and the web content may include various elements of a web page loaded within the web browser. In some implementations, content authenticator 228 of service provider server 220 may communicate over network 202 with an authenticator client 218 at client device 210 to provide various features of the web content authentication service, including the detection of potential security vulnerabilities or threats and the notification of such issues to user 215. Such threats may include, for example, man in the middle attacks, where an attacker modifies the underlying code or injects malicious code in a portion of the web content. As the modification may not be apparent to user 215 when the content is displayed at client device 210, authenticator client 218 may operate in conjunction with content authenticator 228 to automatically verify the authenticity of the web content, e.g., as the content is loaded within application 212. Authenticator client 218 may be a specialized software application that operates alongside application 212 to extend the functionality of application 212 to include automated web content authentication. Such a specialized application may be implemented as an add-on component or extension of application 212, e.g., in the form of a Java applet or a browser extension written using a browser-supported programming language including, but not limited to, JavaScript or any other type of language for writing web applications.

In the web browser example above, authenticator client 218 may automatically generate and transmit, via network 202 to content authenticator 228, the request to authenticate web content (e.g., a web page) loaded within application 212 (or web browser) based on user 215's interaction with the GUI of application 212. User 215 may interact with application 212 (or web browser) by using a user input device (e.g., a mouse or keyboard) to navigate to the web page by entering a web address or URL for the page into an appropriate field of the web browser. It should be appreciated that the request may be sent to content authenticator 228 either before or after the web content is displayed within content area 214 of the application 212 (web browser). The web page and URL may correspond to, for example, a website hosted by service provider server 220 for the web service 222. The request may include data representing various elements of the web content. In some embodiments, authentication client 218 may generate a representation of the web content for the request sent to content authenticator 228. In some implementations, the representation may be a document object model (DOM) tree that includes a plurality of nodes representing the elements of the web content. However, it should be appreciated that embodiments are not intended to be limited thereto and that any data structure may be used to represent the web content.

In some embodiments, the DOM tree included in the request may be a copy of the DOM tree generated by layout engine 216 prior to rendering the web content within content area 214. This allows the disclosed content authentication techniques, e.g., as implemented using authenticator client 218 and content authenticator 228, to provide an automated service that verifies the authenticity of the web content, e.g., as the content is loaded within application 212, without disrupting the normal operation of application 212 from the perspective of user 215. This also allows authenticator client 218 to leverage existing features and components of application 212 (e.g., the default layout engine of a web browser) to provide the content authentication functionality during normal operation of application 212 by user 215.

In some implementations, authenticator client 218 may provide various options (e.g., within a settings panel of application 212) for user 215 to configure the type of functionality that is provided according to the user 215's desired level of security for the content loaded within application 212. Such configuration options may include, for example, selectable options for user 215 to control the timing of the authentication, e.g., by specifying whether the authentication or verification occurs before the content is displayed within content area 214. Such options may be implemented using, for example, multiple radio buttons or a slider control with a sliding element that can be moved to different positions corresponding to different security levels. For example, user 215 may use an input device to select an appropriate radio button or move the sliding element of the slider control to an appropriate position corresponding to one of the following three security options: (1) no authentication; (2) standard authentication (e.g., authentication occurs while the content is loaded and displayed); and (3) enhanced authentication (e.g., the content is displayed only after it has been successfully authenticated). Selecting the second or third options in this example may cause the authentication service to be invoked automatically and user 215 to be notified of any potential security issues detected within the web content. In some embodiments, a notification from content authenticator 228 may cause authenticator client 218 to update the GUI of application 212 to indicate whether or not the content was successfully authenticated. In some implementations, the update may include displaying a visualization (e.g., a graphic overlay) highlighting or otherwise emphasizing a portion of the web content displayed within content area 214 that corresponds to one or more elements of the web content in which a potential security vulnerability was detected.

As described above, server 220 may be associated with a payment service provider (e.g., PayPal®) and web service 222 may be a payment processing service provided by the service provider to facilitate electronic or online transactions initiated by user 215 via application 212 (or web browser) at client device 210. If user 215 has not already been authenticated by web service 222 when navigating to the payment service provider's website, web service 222 may serve a login page for the user 215 to provide authentication credentials associated with an account of user 215. An example of such a login page is shown in FIG. 3.

Figure 3:
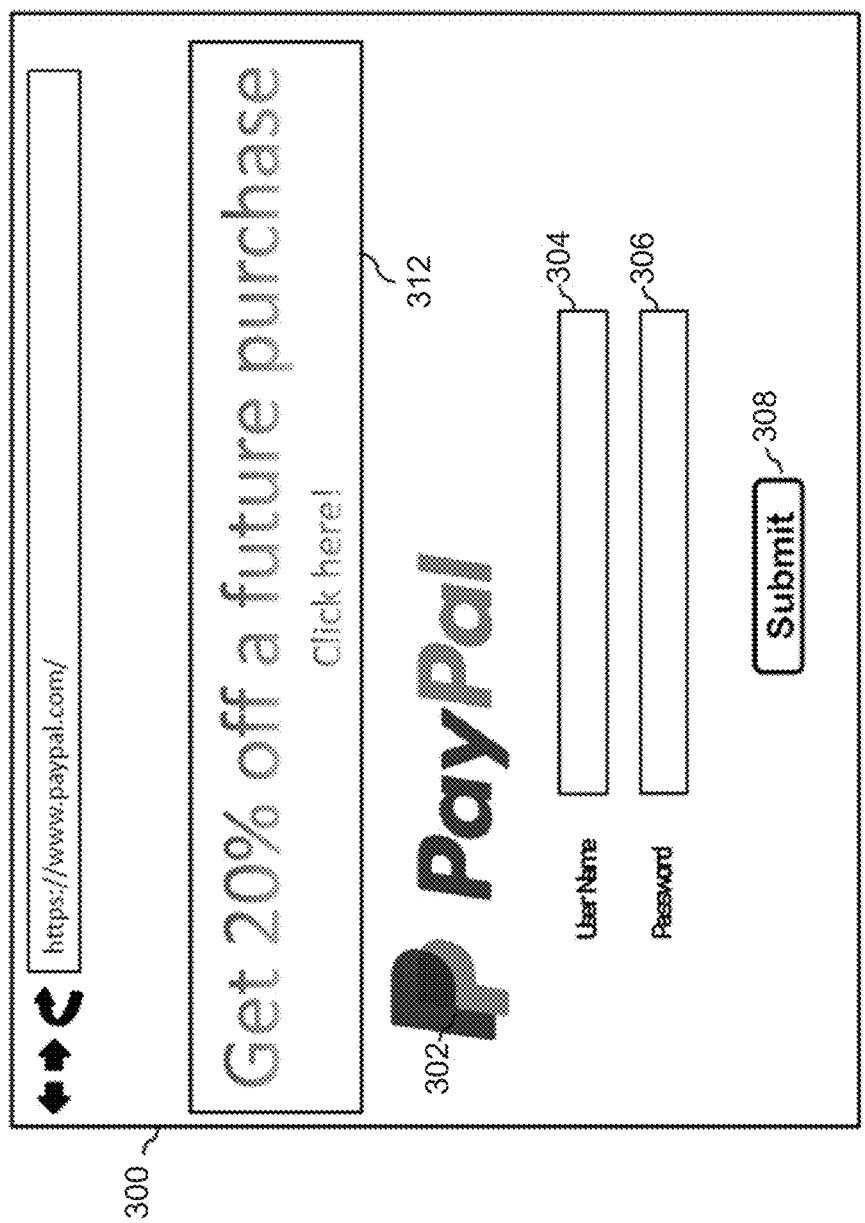
FIG. 3 illustrates an example of a login page including control fields for logging into an account of a user with a service provider.

FIG. 3 illustrates a login page 300 that may be displayed in a web browser for a payment processing service of a payment service provider (e.g., associated with service provider server 200 of FIG. 2, as described above). Login page 300 may be displayed within, for example, content area 214 of application 212 at client device 210 of FIG. 2, as described above. Login page 300 may include a plurality of elements corresponding to different types of web content. Examples of such elements include, but are not limited to, text, images, hyperlinks, and user interface elements, such as input fields. As shown in FIG. 3, the elements of login page 300 may include a company logo 302 along with user interface elements of a login form including, for example, a username input field 304, a password input field 306, and a submit button 308. A user (e.g., user 215 of client device 210) may use a keyboard coupled to the user's device to enter login information (e.g., a username and password) into respective input fields 304 and 306 of the login form. The user may then use a mouse, also coupled to client 110, to submit the entered login information to a payment processing service (e.g., web service 222) by selecting submit button 308.

Also, as shown in FIG. 3, the login page 300 may include dynamic content in the form of an element 312. Element 312 may be, for example, a banner for advertising services of a third-party service provider, e.g., an online merchant associated with third-party server 230 of FIG. 2, as described above. Element 312 may be implemented using, for example, an inline frame (or <iframe> HTML element) that includes an image with an embedded hyperlink that references the third-party service provider's website, e.g., a merchant website hosted by third-party server 230, as described above. Upon selecting the image and embedded hyperlink corresponding to element 312 by using a mouse or other user input device, the user in this example may be automatically redirected away from the login page 300 to a different web page associated with the merchant's website, as shown in FIG. 4.

Figure 4:
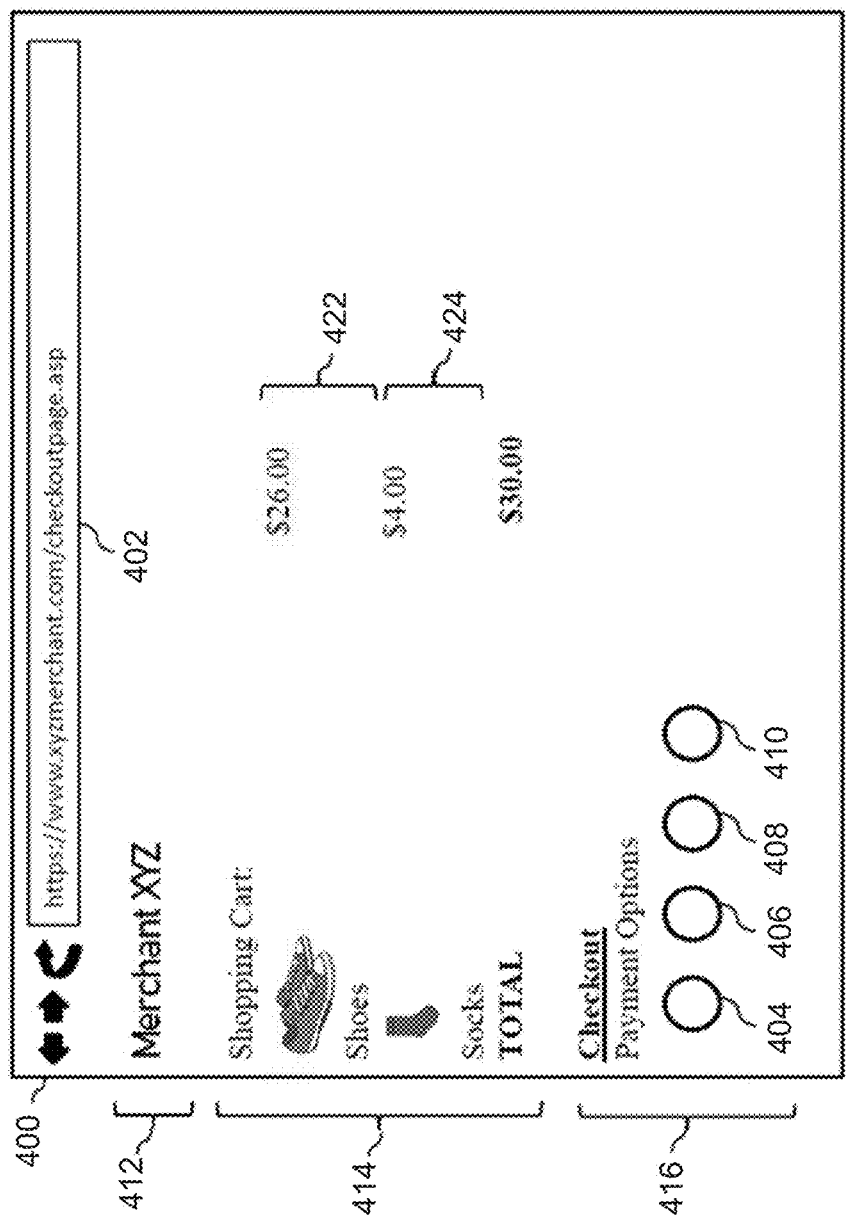
FIG. 4 illustrates an example of a web page including a plurality of web page elements.

FIG. 4 illustrates an example of a web page 400 associated with the website of a merchant. As indicated by the web page address displayed in a web address field 402, web page 400 in this example may represent a checkout page for a transaction initiated by a user (e.g., user 215 via application 212 at client device 210 of FIG. 2, as described above) to purchase an item sold by the merchant via the merchant's website. As shown in FIG. 4, web page 400 may include a merchant logo 412 associated with the merchant, a transaction summary section 414, and a payment option section 416. The transaction summary section 414 in this example includes elements 422 and 424 of web page 400, which show that the transaction is for a purchase of a pair of shoes that costs $26 and a pair of socks that costs $4, and that the total amount due for the transaction is $30. In the payment option section 416, web page 400 may include multiple elements 404-410 corresponding to different payment options, where each option may include a reference or link to initiate a payment transaction with a different payment processing service provided by a corresponding payment service provider. One of these payment options, e.g., element 406, may correspond to, for example, a payment processing service (e.g., web service 222) provided by the service provider (e.g., PayPal®) associated with server 220. The remaining elements 404, 408, and 410 may represent payment options with links to initiate payment transactions with other service providers (e.g., Apple Pay®, VISA®, and American Express®). In some embodiments, the various elements of web page 400 may be generated by a layout engine (e.g., layout engine 216 of FIG. 2, as described above) of the user's web browser for display within a content area (e.g., content area 214 of FIG. 2) of the browser based on programming code for web page 400.

FIG. 5 illustrates an example of programming code 500 that may be associated with web page 400 of FIG. 4, as described above. Programming code 500 may be a segment of the entire programming code associated with the web page 400. The segment of code may correspond to, for example, elements 406 and 408 displayed in payment option section 416 of web page 400. As shown in FIG. 5, programming code 500 includes a code portion 506 and a code portion 508, which correspond to elements 406 and 408 of web page 400, respectively. Code portions 506 and 508 may be written in HTML using the same hierarchical structure, where each portion includes an <input> tag and a <label> tag nested within a <div> tag, which in turn is nested within another <div> tag. Code portions 506 and 508 are both nested on the same nesting level within programming code 500. Programming code 500 and additional programming code (not shown) may be used to generate and display static and dynamic elements of web page 400.

In some embodiments, a document object model (DOM) tree representing various elements of the web content may be generated based on the programming code associated with the web content. The programming code may be downloaded by an application (e.g., application 212 of FIG. 2, as described above) executable at a user device (e.g., client device 210 of FIG. 2, as described above) via a network from a web server (e.g., third-party server 230 of FIG. 2, as described above). The DOM tree may be generated by the application (e.g., layout engine 216 or authentication client 218 of application 212 of FIG. 2) and forwarded from the user device to a web content authentication service (e.g., content authenticator 228 of service provider server 220 of FIG. 2, as described above). The DOM tree may represent how the web page elements (e.g., text, images, multimedia content, user interface elements, etc.) are presented when the web content is rendered by a software application (e.g., a web browser). The content may be rendered, for example, on a display (e.g., a touchscreen, liquid crystal display (LCD) screen, or light-emitting diode (LED) screen) coupled to a user device (e.g., client device 210 of FIG. 2, as described above).

The DOM tree may include a plurality of nodes corresponding to a plurality of elements of the web content (e.g., a web page) in a hierarchical structure. The hierarchical structure of the DOM tree may be representative of a content and a position of each element according to a structure of the underlying programming code. Thus, each node of the DOM tree may represent a content and a position of a corresponding element within the hierarchical structure. The hierarchical structure of the DOM tree may include multiple levels, where each level may represent a corresponding level of the nested programming structure of the web content. For example, when the programming code for the web content is written using a markup language (e.g., HTML) with a nested structure (e.g., using nested HTML tags), the nodes within the hierarchical structure of the generated DOM tree may be representative of this nested structure. Each level within such a DOM tree structure may correspond to a nesting level (e.g., an HTML tag level) within the programming code. A root node in the DOM tree may correspond to a root tag (e.g., the <html> tag) at top-most (or first) level. Each lower level may include one or more nodes, and each node (or group of nodes) may correspond to an element or sub-element of the web content (e.g., the tags and/or attributes associated with an HTML element).

Figure 6:
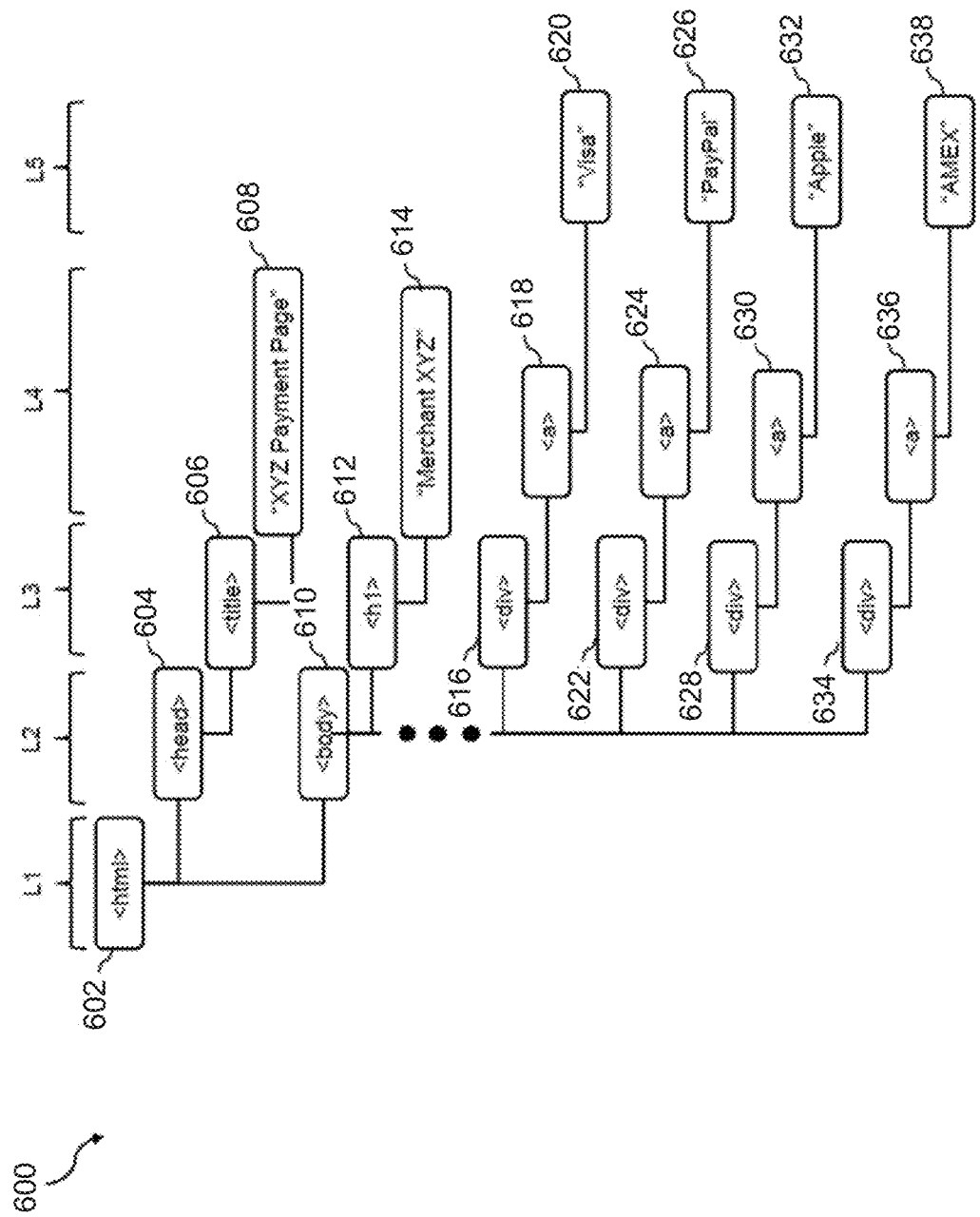
FIG. 6 illustrates a DOM tree generated based on programming code associated with a webpage, according to an embodiment of the present disclosure.

FIG. 6 illustrates an example of a DOM tree 600 that may be generated based on programming code associated with web page 400 of FIG. 4, as described above. The programming code may include, for example, programming code 500 of FIG. 5, as described above. DOM tree 600 includes a plurality of nodes representing the various elements of web page 400. As shown in FIG. 6, DOM tree 600 includes a root node 602 that corresponds to an <html> tag. The root node 602 is the only node that resides on the top level (Level 1 or "L1") of the DOM tree 600. Since all the tags within the programming code are nested within the <html> tag, all remaining nodes in the DOM tree 600 representing the remaining tags in the programming code are nested beneath one or more levels of the root node 602. For example, as the <head> tag and the <body> tag are nested below the <html> tag within the programming code, nodes 604 and 610, which represent the <head> tag and the <body> tag, respectively, reside on Level 2 ("L2") of the DOM tree 600.

Underneath the node 604, the DOM tree 600 includes node 606 in Level 3 and node 608 in Level 4, representing the <title> tag that is nested within the <head> tag and the actual title text "XYZ Merchant Page" that is nested within the <title> tag in the programming code, respectively. Underneath the node 610 that represents the <body> tag, the DOM tree 600 includes multiple nodes that represent most of the displayable content of the web page 400. For example, the DOM tree 600 includes node 612 corresponding to the <h1> tag and node 614 representing the text "Merchant XYZ" that is displayed on the web page 400 (corresponding to the title of the webpage 412). The DOM tree 600 may also include other nodes (not shown) representing other displayable webpage elements of the web page 400, such as elements 422 and 424. Furthermore, the DOM tree 600 includes nodes 616-638 (in Level 3, Level 4, and Level 5), representing webpage elements 404-410 of the web page 400.

In some embodiments, the programming code associated with web page 400 may be analyzed to identify a group of related web page elements based on the content and position of each element within web page 400. For example, one or more graph-based techniques may be used to analyze DOM tree 600 to identify a group of nodes (also referred to herein as "leaf nodes") that correspond to related elements of the web content. Leaf nodes may represent "leaf objects" or "leaf tags" that correspond to related elements of the web content associated with a single layer or level in the hierarchical structure of DOM tree 600. A leaf tag may include, for example, a node or a branch of nodes that may be related to one or more other leaf nodes (e.g., sibling leaf nodes). It is assumed for purposes of this example that related elements of the web content follow a similar programming code structure and that corresponding nodes of a DOM tree are leaf nodes nested on the same level within the hierarchical structure of the DOM tree (e.g., as siblings on a leaf node level at the lower level(s) of the tree). Such a graph-based analysis may be used to identify, for example, a set of leaf nodes corresponding to elements (e.g., leaf tags) that: (i) are on the same level within the hierarchical structure of DOM tree 600 having a common parent node; and (ii) share similar programming code structure or follow a predetermined pattern.

In some embodiments, DOM tree 600 may be preprocessed by removing any nodes that are deemed to be irrelevant to the payment options based on the tags included in the nodes. For example, any nodes (and any corresponding descendant nodes) in DOM tree 600 that represent HTML elements with tags on a predetermined exclusion list may be removed from the DOM tree 600. Examples of tags that may be included in such an exclusion list may include, but are not limited to, a <title> tag, a <script> tag, a <noscript> tag, a <meta> tag, a <link> tag, a <style> tag, a <font> tag, and a <svg> tag. In some cases, the exclusion list may include, for example, tags for elements that are deemed to be either deprecated or irrelevant or unrelated to the host or content provider may be removed.

After DOM tree 600 has been preprocessed, the nodes of DOM tree 600 may be traversed, e.g., according to a depth-first-search order, to identify any nodes or branches of nodes as leaf nodes (e.g., corresponding to leaf tags). As described above, web page 400 may be, for example, a transaction checkout webpage of a merchant website and the nodes of DOM tree 600 may correspond to elements of web page 400 that represent payment options that a user may select for a purchase transaction via the merchant website. The programming code that represents such a payment option may be associated with nested web page elements due to the programmatic nature of the markup language (e.g., HTML) used to generate those elements. For example, a webpage element that includes only text associated with the payment option may be nested within a hyperlink HTML element (e.g., indicated by an <a> tag) for linking to a payment service provider server (e.g., service provider server 220 of FIG. 2, as described above) associated with the payment option, which in turn may be nested within one or more division webpage elements (e.g., indicated by a <div> tag). As shown in FIG. 6, the leaf node 620 (representing the text "Visa") is nested within the leaf node 618 (representing the <a> tag), which in turn is nested within the leaf node 616 (representing the <div> tag).

When a list of related webpage elements (e.g., a list of payment options) is included in a webpage, such webpage elements may be implemented within the same level of the DOM tree structure under the same parent node. In this example, the related webpage elements 404-410 of web page 400 of FIG. 4 may be represented in DOM tree 600 as groups of nodes, including a first group of nodes 616-620 representing the webpage element 404, a second group of nodes 622-626, representing the webpage element 406, a third group of nodes 628-632, representing the webpage element 408, and a fourth group of nodes 634-638, representing the webpage element 410. These groups of nodes (each group may be identified as a leaf tag by the code analysis module 206) share the same parent node 610.

Thus, when a node (e.g., the node 618 representing the hyperlink webpage element) has been identified as a leaf node (or leaf tag) while traversing DOM tree 600 based on the criteria discussed above, a determination may be made as to whether the node (or the branch of nodes 618-620) has any siblings (e.g., other nodes or branches of nodes in the same level of the DOM tree 600 that share the same parent node). If it is determined that the node (or the branch of nodes) has one or more siblings within the DOM tree 600, the node (or the branch of nodes) and its siblings may be classified as leaf nodes. On the other hand, if it is determined that the node (or the branch of nodes) has no siblings, DOM tree 600 may be iteratively traversed upward to parent nodes (e.g., to the node that represents the division webpage element) until a parent node with one or more siblings has been identified, in which case the identified parent node and its siblings may be classified as leaf nodes. If no parent node has been identified before reaching the root node of the DOM tree 600, the corresponding branch of nodes may be ignored and a subsequent branch of the DOM tree 600 may be traversed instead.

In this example, it may be determined that the branch of nodes including nodes 618-620 has no siblings (e.g., no other branch of nodes in Level 4 having the same parent node 616). Thus, DOM tree 600 may be traversed upwards to a parent node (e.g., the node 616) to determine whether the corresponding branch of nodes that includes nodes 616-620 has any siblings. As shown in FIG. 6, the branch of nodes 616-620 has several siblings that share the parent node 610, including the branch of nodes 622-626, the branch of nodes 628-632, and the branch of nodes 634-638. Thus, each of these branches of nodes, including the branch of nodes 616-620, the branch of nodes 622-626, the branch of nodes 628-632, and the branch of nodes 634-638, may be identified as leaf nodes.

The programming code associated with web content, e.g., the elements of web page 400 as represented by DOM tree 600 described above, may be vulnerable to interception and modification by an attacker or cybercriminal. For example, an attacker may replace legitimate object references and links with links to counterfeit web pages or other web documents controlled by the attacker and designed to steal sensitive information (e.g., account login credentials) from unsuspecting users. Accordingly, embodiments of the present disclosure may be used to provide a content authentication service to authenticate web content loaded within an application (e.g., a web browser) executable at a user device. Referring back to system 200 of FIG. 2, such an authentication service may be implemented using content authenticator 228 of service provider server 220 in conjunction with authentication client 218 of client device 210, as described above. As will be described in further detail below with respect to FIG. 7, such a web content authentication service may authenticate or verify the integrity of web content (e.g., web page 400) by comparing nodes of a DOM tree (e.g., DOM tree 600) generated for the web content with the corresponding nodes of a predefined DOM tree representing predefined elements of the web content, e.g., as provided by a provider or host of the web content.

Figure 7:
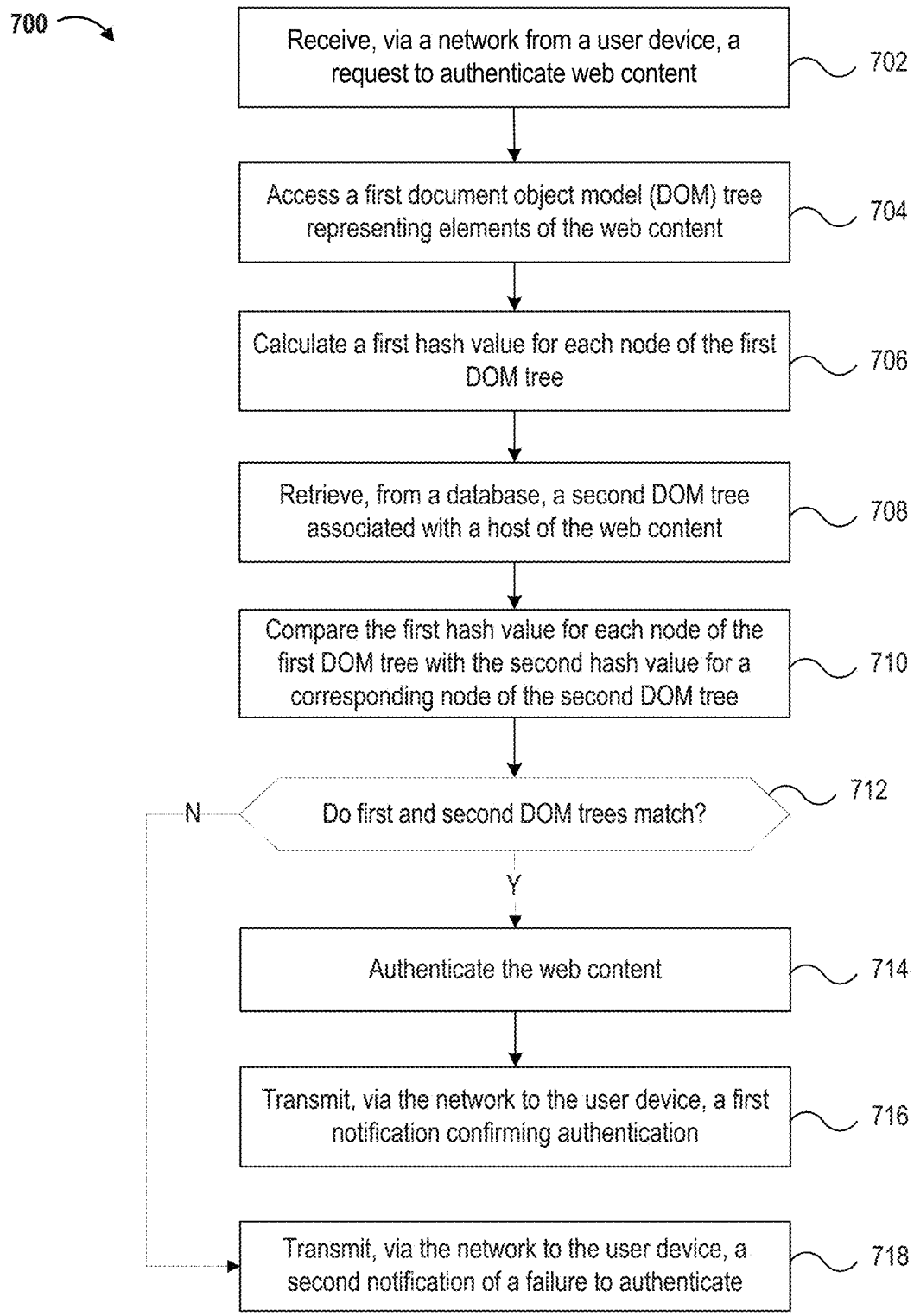
FIG. 7 is a flowchart of a process for authenticating web content to ensure the integrity of the content, according to an embodiment of the present disclosure.

FIG. 7 is a flowchart of a process 700 for authenticating web content to assure content integrity, according to an embodiment of the present disclosure. In some embodiments, process 700 may be performed as part of a content authentication service provided by a risk assessment system of a service provider. For discussion purposes, process 700 will be described using system 200 of FIG. 2, as described above, but process 700 is not intended to be limited thereto. For example, process 700 may be performed by content authenticator 228 of service provider server 220 of FIG. 2, as described above.

As shown in FIG. 7, process 700 begins in block 702, which includes receiving, via a network from a user device, a request to authenticate web content. The web content may be loaded within an application executable at the user device (e.g., application 212 at client device 210 of FIG. 2, as described above). In some embodiments, the request may include information identifying a host of the web content. The host may be a server associated with a service provider (e.g., service prover server 220 of FIG. 2, as described above) or a server associated with a third-party entity (e.g., third-party server 230 or 240 of FIG. 2, as described above). The third-party entity may be, for example, a business partner or other trusted third-party associated with the service provider. In some implementations, the application may be a web browser and the web content may be a web page loaded within the browser, as described above. Alternatively, the application executable at the user device may be, for example, an electronic mail (email) client, and the web content may be included in an email message loaded within the email client.

Process 700 then proceeds to block 704, which includes accessing a first document object model (DOM) tree representing a plurality of elements of the web content, based on the request received in block 702. The plurality of elements of the web content may include, for example, dynamic elements that a layout engine of the application (e.g., layout engine 216 of application 212 in FIG. 2, as described above) at the user device generates based on programming code associated with the web content. The first DOM tree may include a plurality of nodes corresponding to the plurality of elements. Each node of the first DOM tree may represent a corresponding element within a hierarchical structure of the first DOM tree. In some embodiments, the first DOM tree may be included in the request received from the user device in block 702.

In block 706, a first hash value is calculated for each node of the first DOM tree based on a corresponding element of the web content represented by that node within the hierarchical structure of the first DOM tree. In some embodiments, object data, including information about the content and position of each element of the web content, e.g., as represented within the hierarchical structure of the first DOM tree, may be extracted from the first DOM tree. The first hash value may be calculated for each node of the first DOM tree based on the extracted object data, e.g., a content and a position, of the corresponding element represented by that node. The content data for each element of the web content may relate to, for example, one or more visual characteristics of each element, e.g., as determined based on analyzing the programming code associated with the web content. Examples of such visual characteristics include, but are not limited to, a size, a color, and other characteristics relating to the appearance of the element as displayed or rendered at the user device, e.g., within content area 214 of application 212 executable at device 210 of FIG. 2, as described above.

In some implementations, leaf nodes of the first DOM tree may be identified and the hash value calculated for each node of the first DOM tree in block 706 may include: calculating a hash value for each leaf node of the identified leaf nodes of within the hierarchical structure of the first DOM tree; identifying, for each branch of the first DOM tree, one or more intermediate nodes stemming from the root node to each leaf node of the first DOM tree within the hierarchical structure; calculating a hash value for each intermediate node of the intermediate node(s) identified for each branch of the first DOM tree, based on the hash value of the leaf node corresponding to the branch and a position of the intermediate node within the hierarchical structure of the first DOM tree; and calculating a root hash value for the root node of the first DOM tree based on the respective hash values calculated for nodes of the first DOM tree corresponding to each branch.

In some embodiments, the first hash value may be associated with a node of a hash tree generated from the first DOM tree received with the request in block 702. The generated hash tree may include a plurality of nodes corresponding to the plurality of elements represented by the first DOM tree. Each node of the generated hash tree may include the first hash value for a corresponding element of the web content. In some implementations, the hash tree may be generated after the plurality of nodes of the first DOM tree are sequentially indexed according to the content and the position of each element of the web content as represented within the hierarchical structure of the first DOM tree. For example, the nodes of the first DOM tree (e.g., DOM tree 600 of FIG. 6, as shown above) may be indexed in a top-down, left-to-right manner, starting from the root node and ending with the leaf nodes corresponding to the branches of the first DOM tree. However, it should be appreciated that the nodes of the first DOM tree may be indexed in any order as desired for a particular implementation, e.g., in bottom-up manner starting from the leaf nodes and ending with the root node. The indexed nodes of the DOM tree in this example may serve as the leaf nodes of the generated hash tree.

In block 708, a second DOM tree associated with the host of the web content, e.g., as identified from the request received in block 702, may be retrieved from a database. The second DOM tree may be, for example, a predefined DOM tree that represents predefined elements of the web content expected to be loaded on the user device.

In block 710, the first hash value calculated for each node of the first DOM tree is compared with a second hash value associated with a corresponding node of the second DOM tree. The second hash value associated with each node of the second DOM tree may be a predefined value that corresponds to the predefined element of the web content represented by that node. The second hash value may be calculated based on, for example, a predetermined content and/or a predetermined position of the corresponding element. In some embodiments, the second hash value may be a predefined value for a corresponding node of a predefined hash tree associated with the web content. The predefined hash tree may be retrieved from the database in block 708. Accordingly, the comparison in block 710 may involve, for example, comparing the first hash value of each node of the hash tree generated from the first DOM tree, as described above, with a second hash value of a corresponding node of the predefined hash tree associated with the web content.

Process 700 then proceeds to block 712, which includes determining whether the first DOM tree matches the second DOM tree, based on the comparison in block 710. In some embodiments, it may be determined that the first DOM tree matches the second DOM tree when the first hash value calculated for each node of the first DOM tree matches the second hash value associated with the corresponding node of the second DOM tree. In some implementations, the comparison in block 710 may be between only the root hash values of the respective DOM trees, where the root hash value calculated for the first DOM tree may be compared with a predefined root hash value of the second DOM tree to determine whether the first DOM tree matches the second DOM tree. In some embodiments, where the comparison of hash value in block 710 is between corresponding nodes of a generated hash tree and a predefined hash tree associated with the web content, as described above, block 712 may involve determining whether the generated hash tree matches the predefined hash tree.

If it is determined in block 712 that the first and second DOM trees match (or, alternatively, that the generated hash tree matches the predefined hash tree), process 700 proceeds to block 714, which includes authenticating the web content. In block 716, a first notification confirming the authentication of the web content may be transmitted via the network to the user device. In some embodiments, the first notification may be transmitted to an authentication client (e.g., authentication client 218 of FIG. 2, as described above) that executes on the user device and operates in conjunction with the application to implement various features of the disclosed web content authentication techniques. For example, the application may be a web browser and the authentication client may be a browser extension configured to send and receive information over the network to and from a web content authentication service provided by a remote server of a service provider (e.g., service provider server 220 of FIG. 2, as described above). The first notification transmitted to the user device may cause the browser extension in this example to update a user interface of the web browser to indicate the authentication of the web content (e.g., web page). The indication may be, for example, a message displayed in a pop-up dialog window displayed via a graphical user interface (GUI) of the web browser at the user device. It should be appreciated, however, that any of various visualization techniques may be used to provide such an indication to the user.

If, however, it is determined in block 712 that the first and second DOM trees do not match (or that the generated hash tree does not match the predefined hash tree), process 700 proceeds to block 718 instead of blocks 714 and 716. In block 718, a second notification of a failure to authenticate the web content (e.g., web page) is transmitted via the network to the user device. Like the first notification, the second notification may also cause an authentication client (e.g., browser extension) executed at the user device to update the user interface of the application (e.g., web browser) in which the web content is loaded to indicate the failure to authenticate.

In some implementations, notifications similar to the first and second notifications transmitted to the user device at blocks 716 and 718 may also be transmitted to a host of the web content as part of a transaction risk assessment system of the service provider, as described above. For example, the web content may be part of web page associated with a merchant web site hosted at a merchant server (e.g., third-party server 230 of FIG. 2, as described above). A notification of either success or failure to authenticate the web content may be used to determine a risk associated with a transaction between the user device and the merchant web site, e.g., involving the purchase by the user of a product sold by the merchant. The merchant in this example may determine whether the transaction should be authorized or denied based on the notification received from the risk assessment system (i.e., authorized only if the web content has been authenticated successfully).

In some embodiments, the plurality of nodes of the first DOM tree may correspond to leaf nodes of a hash tree generated for the web content. Accordingly, the hash tree may include a plurality of nodes corresponding to the plurality of elements represented by the first DOM tree. In some embodiments, the first hash value for each node of the first DOM tree may be calculated based on the content and the position of the corresponding element represented by that node. In some embodiments, object data, including information about the content and position of each element of the web content, may be extracted from the first DOM tree. The first hash value may be calculated for each node of the first DOM tree based on the object data extracted for the corresponding element represented by that node. In some implementations, the nodes of the first DOM tree may be sequentially indexed based on the content and the position of each node within the hierarchical structure of the tree.

While the examples illustrated above describe identifying an order and/or positions of various payment options within a transaction checkout webpage, the same techniques may be used to identify other types of related webpage elements, such as a group of related icons, a group of related selectable options, etc. without departing from the spirit of the disclosure. For example, the disclosed techniques may be used to identify positions of different web data associated with different entities within a review website, such as a ranking of different products or services.

Figure 8:
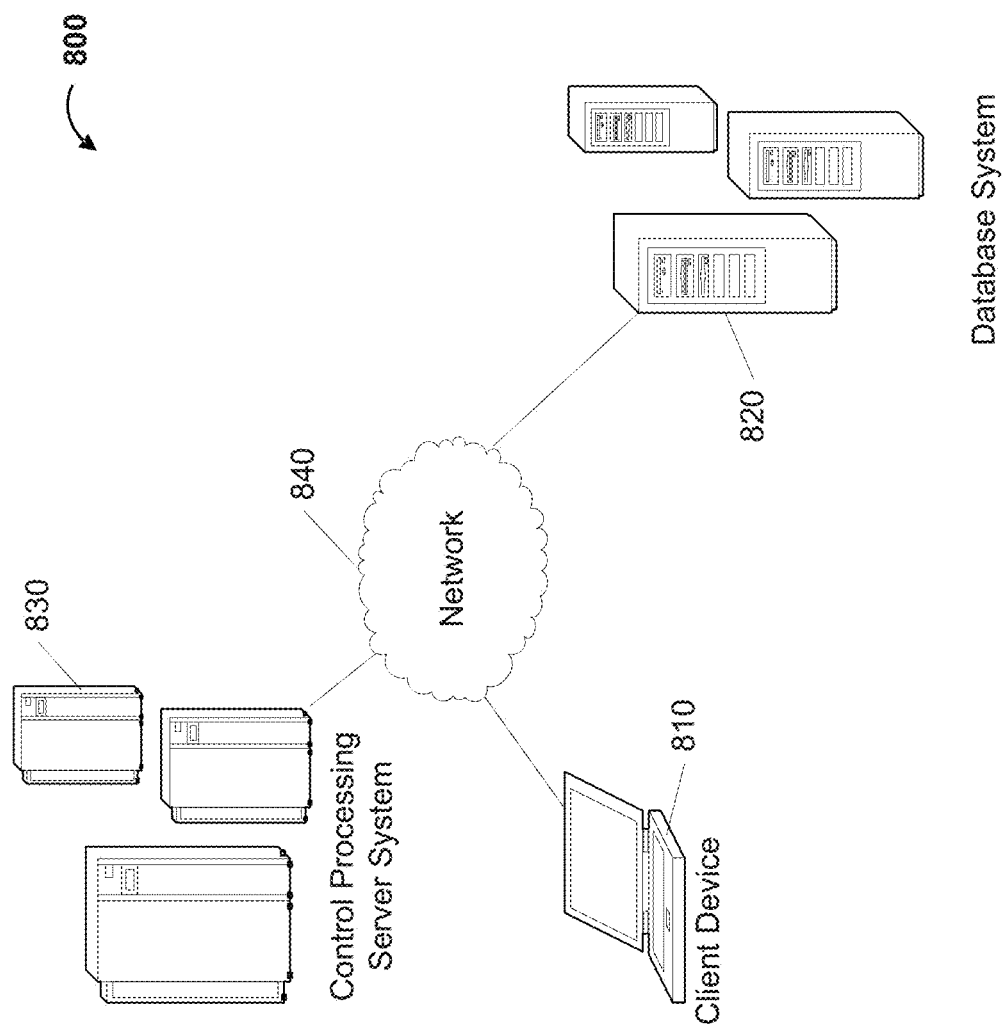
FIG. 8 is a block diagram of a distributed client-server system in which embodiments of the present disclosure may be implemented.

FIG. 8 is a block diagram of a distributed client-server system 800 in which embodiments of the present disclosure may be implemented. The system 800 may include at least one client device 810, at least one database system 820, and/or at least one server system 830 in communication via a network 840. It will be appreciated that the network connections shown are illustrative and any means of establishing a communications link between the computers may be used. The existence of any of various network protocols such as TCP/IP, Ethernet, FTP, HTTP, and the like, and of various wireless communication technologies such as GSM, CDMA, Wi-Fi, and LTE, is presumed, and the various computing devices described herein may be configured to communicate using any of these network protocols or technologies. Any of the devices and systems described herein may be implemented, in whole or in part, using one or more computing systems described with respect to FIG. 8.

Client device 810 may access server applications and/or resources using one or more client applications (not shown)

as described herein. Client device 810 may be a mobile device, such as a laptop, smart phone, mobile phones, or tablet, or computing devices, such as a desktop computer or a server, wearables, embedded devices. Alternatively, client device 810 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 820 may be configured to maintain, store, retrieve, and update information for server system 830. Further, database system may provide server system 830 with information periodically or upon request. In this regard, database system 820 may be a distributed database capable of storing, maintaining, and updating large volumes of data across clusters of nodes. Database system 820 may provide a variety of databases including, but not limited to, relational databases, hierarchical databases, distributed databases, in-memory databases, flat file databases, XML databases, NoSQL databases, graph databases, and/or a combination thereof.

Server system 830 may be configured with a server application (not shown) that is capable of interfacing with client application and database system 820 as described herein. In this regard, server system 830 may be a stand-alone server, a corporate server, or a server located in a server farm or cloud-computer environment. According to some examples, server system 830 may be a virtual server hosted on hardware capable of supporting a plurality of virtual servers.

Network 840 may include any type of network. For example, network 840 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 800 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 800. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 800 in front of one or more computing devices such that any external devices may communicate directly with the specialized hardware.

Figure 9:
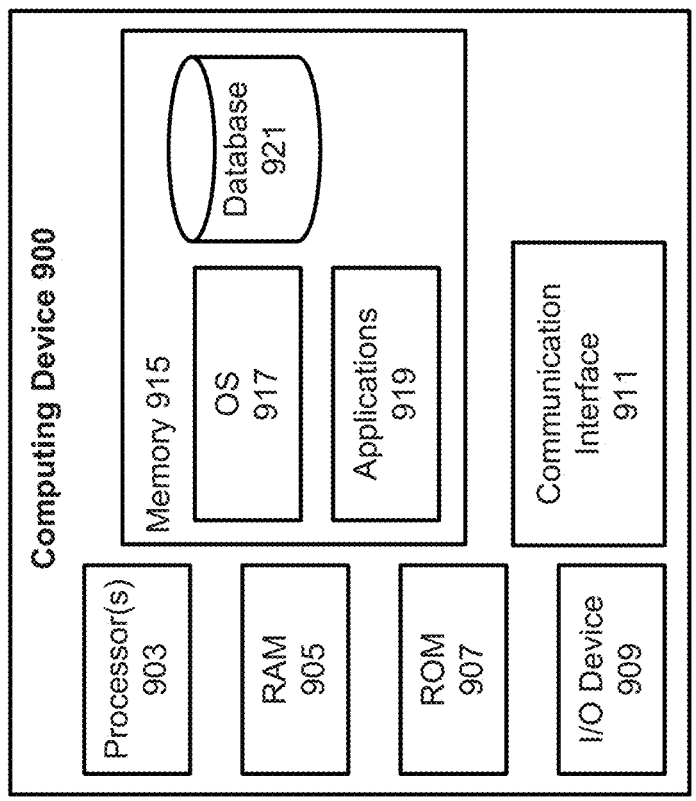
FIG. 9 is a block diagram of a computing device in which embodiments of the present disclosure may be implemented.

FIG. 9 is a block diagram of a computing device 900 in which embodiments of the present disclosure may be implemented. Computing device 900 that may be used with one or more of the computational systems is described. The computing device 900 may include a processor 903 for controlling overall operation of the computing device 900 and its associated components, including RAM 905, ROM 907, input/output (I/O) device 909, communication interface 911, and/or memory 915. A data bus may interconnect processor(s) 903, RAM 905, ROM 907, memory 915, I/O device 909, and/or communication interface 911. In some embodiments, computing device 900 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 909 may include a microphone, keypad, touch screen, and/or stylus motion, gesture, through which a user of the computing device 900 may provide input, and may also include one or more of a speaker for providing audio output and a video display device for providing textual, audiovisual, and/or graphical output. Software may be stored within memory 915 to provide instructions to processor 903 allowing computing device 900 to perform various actions. For example, memory 915 may store software used by the computing device 900, such as an operating system 917, application programs 919, and/or an associated internal database 921. The various hardware memory units in memory 915 may include volatile and nonvolatile, removable and non-removable media implemented in any method or technology for storage of information such as computer-readable instructions, data structures, program modules, or other data. Memory 915 may include one or more physical persistent memory devices and/or one or more non-persistent memory devices. Memory 915 may include, but is not limited to, random access memory (RAM) 905, read only memory (ROM) 907, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 903.

Communication interface 911 may include one or more transceivers, digital signal processors, and/or additional circuitry and software for communicating via any network, wired or wireless, using any protocol as described herein.

Processor 903 may include a single central processing unit (CPU), which may be a single-core or multi-core processor, or may include multiple CPUs. Processor(s) 903 and associated components may allow the computing device 900 to execute a series of computer-readable instructions to perform some or all of the processes described herein.

Although not shown in FIG. 9, various elements within memory 915 or other components in computing device 900, may include one or more caches, for example, CPU caches used by the processor 903, page caches used by the operating system 917, disk caches of a hard drive, and/or database caches used to cache content from database 921. For embodiments including a CPU cache, the CPU cache may be used by one or more processors 903 to reduce memory latency and access time. A processor 903 may retrieve data from or write data to the CPU cache rather than reading/writing to memory 915, which may improve the speed of these operations. In some examples, a database cache may be created in which certain data from a database 921 is cached in a separate smaller database in a memory separate from the database, such as in RAM 905 or on a separate computing device. For instance, in a multi-tiered application, a database cache on an application server may reduce data retrieval and data manipulation time by not needing to communicate over a network with a back-end database server. These types of caches and others may be included in various embodiments and may provide potential advantages in certain implementations of devices, systems, and methods described herein, such as faster response times and less dependence on network conditions when transmitting and receiving data.

Although various components of computing device 900 are described separately, functionality of the various components may be combined and/or performed by a single component and/or multiple computing devices in communication without departing from the invention.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
a non-transitory memory; and
one or more hardware processors coupled to the non-transitory memory and configured to read instructions from the non-transitory memory to cause the system to perform operations comprising:
receiving, via a network from a user device, a request to authenticate web content loaded within an application that is executed on the user device, the request including information identifying a host of the web content;
accessing a first document object model (DOM) tree representing a plurality of elements of the web content based on the received request, the first DOM tree including a plurality of nodes corresponding to the plurality of elements, each node of the plurality of nodes representing a corresponding element of the web content within a hierarchical structure of the first DOM tree;
generating a first hash tree based on the first DOM tree, wherein the generating the first hash tree comprises calculating a hash value for each node of the first DOM tree based on a content and a position of the corresponding element of the web content represented by the node within the hierarchical structure of the first DOM tree;
retrieving, from a database, a second hash tree generated based on a second DOM tree associated with the host of the web content, the second DOM tree representing predefined elements of the web content;
comparing the first hash tree with the second tree; and
determining whether to authenticate the web content based on the comparing the first hash tree with the second hash tree.

2. The system of claim 1, wherein the application is a web browser, and wherein the web content is part of a web page loaded within the web browser.

3. The system of claim 2, wherein the request is received from a browser extension associated with the web browser, and wherein the operations further comprise:
in response to determining that the web content is authenticated, transmitting, via the network to the user device, a first notification confirming an authentication of the web page, wherein the notification causes the browser extension to update a user interface of the web browser to indicate the authentication of the web page.

4. The system of claim 2, wherein the request is received from a browser extension associated with the web browser, and wherein the operations further comprise:
in response to determining that the web content is not authenticated, transmitting, via the network to the user device, a notification of a failure to authenticate the web page, wherein the notification causes the browser extension to update a user interface of the web browser to indicate the failure.

5. The system of claim 1, wherein the first hash tree comprises a first set of hash values calculated for a first set of nodes of the first DOM tree, wherein the second hash tree comprises a second set of hash values calculated for a second set of nodes of the second DOM tree, and wherein the operations further comprise determining that the first hash tree matches the second hash tree when the first set of hash values matches the second set of hash values.

6. The system of claim 1, wherein the application is an email client, and wherein the web content is included within an email message loaded within the email client.

7. The system of claim 1, wherein the plurality of elements of the web content includes dynamic elements that are generated based on programming code associated with the web content.

8. The system of claim 1, wherein nodes of the first hash tree are sequentially indexed according positions of corresponding elements of the web content.

9. A computer-implemented method comprising:
receiving, by a server via a network, a request to authenticate web content loaded within an application that is executed on a client device, the request including a first document object model (DOM) tree representing a plurality of elements of the web content;
generating, by the server, a first hash tree including a plurality of nodes corresponding to the plurality of elements represented by the first DOM tree, each node of the plurality of nodes of the first hash tree including a hash value calculated for a corresponding element of the web content based on a content and a position of the corresponding element within the web content;
comparing the first hash tree with a second hash tree generated based on a second DOM tree associated with a host of the web content; and
determining whether to authenticate the web content based on the comparing the first hash tree with the second hash tree.

10. The computer-implemented method of claim 9, further comprising:
extracting, by the server, object data for the plurality of elements of the web content represented by the first DOM tree received from the client device, wherein the generating the first hash tree is based on the object data.

11. The computer-implemented method of claim 9, wherein the content and the position of the corresponding element of the web content are represented within a hierarchical structure of the first DOM tree.

12. The computer-implemented method of claim 9, wherein the plurality of nodes of the first hash tree is sequentially indexed according to contents and positions of the plurality of elements of the web content represented within a hierarchical structure of the first DOM tree.

13. The computer-implemented method of claim 9, wherein the application is a web browser, and wherein the web content comprises a web page loaded within the web browser.

14. The computer-implemented method of claim 13, wherein the request is received from a browser extension associated with the web browser, and wherein the method further comprises:
in response to determining that the web content is authenticated, transmitting, via the network to the client device, a notification confirming an authentication of the web page, wherein the notification causes the browser extension to update a user interface of the web browser to indicate the authentication of the web page.

15. The computer-implemented method of claim 13, wherein the operations further comprise:
in response to determining that the web content is not authenticated, transmitting, via the network to the client device, a notification of a failure to authenticate the web page, wherein the notification causes the browser extension to update a user interface of the web browser to indicate the failure.

16. A non-transitory machine-readable medium having stored thereon machine-readable instructions executable to cause a machine to perform operations comprising:
receiving, via a network, a request to authenticate web content loaded within an application that is executed on a client device, the request including a first document object model (DOM) tree representing a plurality of elements of the web content;
generating a first hash tree including a plurality of nodes corresponding to the plurality of elements represented by the first DOM tree, each node of the first hash tree including a hash value calculated for a corresponding element of the web content based on a content and a position of the corresponding element within the web content;
retrieving, from a database, a second hash tree associated with a host of the web content, the second hash tree including nodes that correspond to predefined elements of the web content;
comparing the first hash tree with the second hash tree; and
determining whether to authenticate the web content based on the comparing the first hash tree with the second hash tree.

17. The non-transitory machine-readable medium of claim 16, wherein the operations further comprise:
extracting object data for the plurality of elements of the web content represented by the first DOM tree received from the client device, wherein the generating the first hash tree is based on the object data.

18. The non-transitory machine-readable medium of claim 16, wherein the content and the position of the corresponding element of the web content are represented within a hierarchical structure of the first DOM tree.

19. The non-transitory machine-readable medium of claim 16, wherein the plurality of nodes of the first hash tree is sequentially indexed according to contents and positions of the plurality of elements of the web content represented within a hierarchical structure of the DOM tree.

20. The non-transitory machine-readable medium of claim 19, wherein the application is a web browser, and wherein the web content is a web page loaded within the web browser.

* * * * *